United States Patent
Holladay

Patent Number: 5,553,914
Date of Patent: Sep. 10, 1996

[54] TODDLER CAR SEAT SHADE

[76] Inventor: Carshena Y. Holladay, 408 Keith Ct., Chesapeake, Va. 23325

[21] Appl. No.: 529,742

[22] Filed: Sep. 18, 1995

[51] Int. Cl.⁶ ........................................ A47C 7/66
[52] U.S. Cl. .................... 297/184.17; 135/96; 135/151
[58] Field of Search ................ 297/184.13, 184.17; 135/96, 132, 133, 144, 147, 148, 151

[56] References Cited

U.S. PATENT DOCUMENTS

| | | | |
|---|---|---|---|
| 536,131 | 3/1895 | Coldwell | 135/151 |
| 3,369,786 | 2/1968 | Schloemer | 297/410 X |
| 4,093,305 | 6/1978 | Slaroste et al. | 297/184.17 |
| 4,293,162 | 10/1981 | Pap et al. | 135/96 X |
| 4,469,114 | 9/1984 | Kelley et al. | 135/133 |

FOREIGN PATENT DOCUMENTS

| | | | |
|---|---|---|---|
| 426002 | 6/1911 | France | 135/96 |
| 8201984 | 6/1982 | WIPO | 297/184.17 |
| 8505543 | 12/1985 | WIPO | 297/184.15 |

*Primary Examiner*—Peter R. Brown

[57] ABSTRACT

A toddler car seat shade, comprising, an inverted U-shaped frame member which has downwardly extending vertical legs and an arcuate upper extent. The vertical legs each have a plurality of positioning apertures therethrough and a coupling aperture at the upper extent of each leg. An elongated inverted C-shaped frame member is provided with apertures at its free internal ends. Pivot pins are positionable through the apertures of the elongated inverted C-shaped frame member and the coupling apertures of the inverted U-shaped frame member to effect the pivotal coupling therebetween. A plurality of intermediate C-shaped frame members of varying sizes with apertures at their free ends are secured to the pivot pins. A cloth is positionable over the inverted U-shaped frame member and the elongated C-shaped frame members with a hem in the cloth secured to the U-shaped frame member and the elongated C-shaped frame member.

1 Claim, 3 Drawing Sheets

TODDLER CAR SEAT SHADE

BACKGROUND OF THE INVENTION

1. Field of the Invention

The present invention relates to toddler car seat shade and more particularly pertains to provide shade to a child in any car seat through a readily attachable and usable device.

2. Description of the Prior Art

The use of car seats for children and sun shades of various designs and configuration is known in the prior art. More specifically, car seats for children and sun shades of various designs and configuration heretofore devised and utilized for the purpose of providing safety and comfort for children when seated through various methods and apparatuses are known to consist basically of familiar, expected and obvious structural configurations, notwithstanding the myriad of designs encompassed by the crowded prior art which have been developed for the fulfillment of countless objectives and requirements.

By way of example, the prior art discloses in U.S. Pat. No. 4,785,838 to Negahdari discloses a multipurpose infant shade.

U.S. Pat. No. 4,947,883 to Mayo discloses an infant sun shade apparatus.

U.S. Pat. No. 4,583,779 to Myers discloses a sun shade for an infants car seat.

U.S. Pat. No. 4,293,162 to Pap et al., discloses a sun shade for infant seat and the like.

Lastly, U.S. Pat. No. 4,784,426 to Mannisto-Iches discloses an infant protector shade for automobile use.

In this respect, the toddler car seat shade according to the present invention substantially departs from the conventional concepts and designs of the prior art, and in so doing provides an apparatus primarily developed for the purpose of providing shade to a child in any car seat through a readily attachable and usable device.

Therefore, it can be appreciated that there exists a continuing need for new and improved toddler car seat shade which can be used for providing shade to a child in any car seat through a readily attachable and usable device. In this regard, the present invention substantially fulfills this need.

SUMMARY OF THE INVENTION

In view of the foregoing disadvantages inherent in the known types of car seats for children and sun shades of various designs and configuration now present in the prior art, the present invention provides an improved toddler car seat shade. As such, the general purpose of the present invention, which will be described subsequently in greater detail, is to provide a new and improved toddler car seat shade apparatus and method which has all the advantages of the prior art and none of the disadvantages.

To attain this, the present invention essentially comprises a new and improved toddler car seat shade, comprising, in combination, an inverted U-shaped frame member with downwardly extending vertical legs and an arcuate upper extent. The vertical legs each have a plurality of positioning apertures therethrough and a coupling aperture at the upper extent of each leg. A pair of similarly configured receptor blocks are provided. Each receptor block has a vertical planar flange with apertures for the receipt of screws for coupling with respect to the opposite side portions of a toddler car seat adjacent to an upper extent thereof. The blocks each have a central vertical bore for receiving the vertical legs of the U-shaped frame member. The blocks each have a horizontal aperture therethrough with a bolt extending therethrough and through a preselected positioning aperture of the vertical legs for varying the height of the U-shaped frame member with respect to the car seat. An elongated inverted C-shaped frame member has apertures at its free internal ends. Pivot pins are positionable through the apertures of the elongated inverted C-shaped frame member and the coupling apertures of the inverted U-shaped frame member to effect the pivotal coupling therebetween. Two intermediate C-shaped frame members of varying sizes with apertures at their free ends are secured to the pivot pins. A cloth is positionable over the inverted U-shaped frame member and the elongated C-shaped frame members with a hem in the cloth secured to the U-shaped frame member and the elongated C-shaped frame member.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved toddler car seat shade which has all the advantages of the prior art car seats for children and sun shades of various designs and configuration and none of the disadvantages.

It is another object of the present invention to provide a new and improved toddler car seat shade which may be easily and efficiently manufactured and marketed.

It is a further object of the present invention to provide a new and improved toddler car seat shade which is of a durable and reliable construction.

An even further object of the present invention is to provide a new and improved toddler car seat shade which is susceptible of a low cost of manufacture with regard to both materials and labor, and which accordingly is then susceptible of low prices of sale to the consuming public, thereby making such car seats for children and sun shades of various designs and configuration economically available to the buying public.

Still yet another object of the present invention is to provide a new and improved toddler car seat shade which provides in the apparatuses and methods of the prior art some of the advantages thereof, while simultaneously overcoming some of the disadvantages normally associated therewith.

Still another object of the present invention is to provide shade to a child in any car seat through a readily attachable and usable device.

Lastly, it is an object of the present invention to provide a new and improved toddler car seat shade, comprising, an inverted U-shaped frame member which has downwardly extending vertical legs and an arcuate upper extent. The vertical legs each have a plurality of positioning apertures therethrough and a coupling aperture at the upper extent of each leg. An elongated inverted C-shaped frame member is provided with apertures at its free internal ends. Pivot pins are positionable through the apertures of the elongated inverted C-shaped frame member and the coupling apertures of the inverted U-shaped frame member to effect the pivotal coupling therebetween. A plurality of intermediate C-shaped frame members of varying sizes with apertures at their free ends are secured to the pivot pins. A cloth is positionable over the inverted U-shaped frame member and the elongated C-shaped frame members with a hem in the cloth secured to the U-shaped frame member and the elongated C-shaped frame member.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
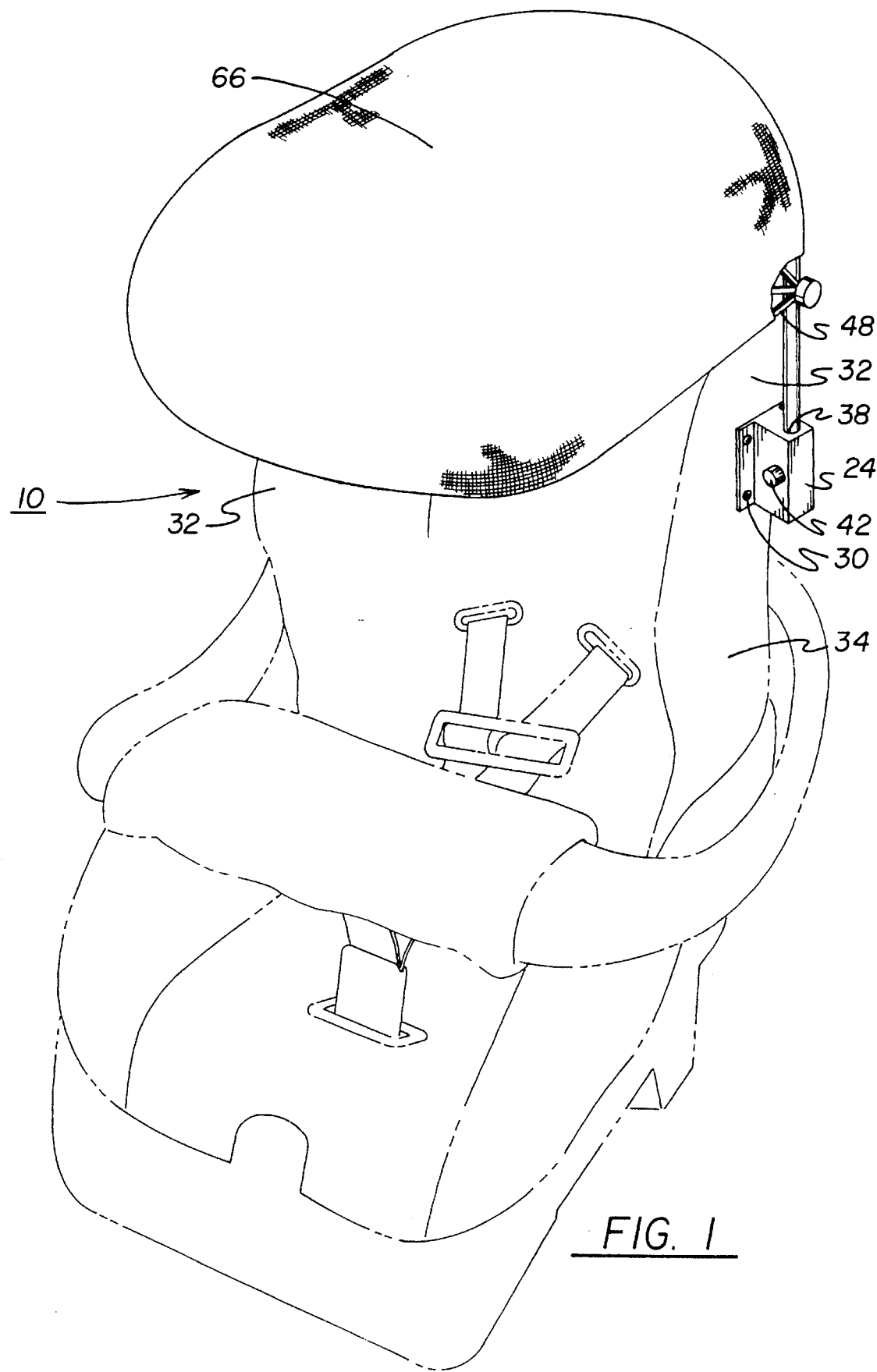
FIG. 1 is a perspective illustration of the preferred embodiment of the toddler car seat shade constructed in accordance with the principles of the present invention.
Figure 2:
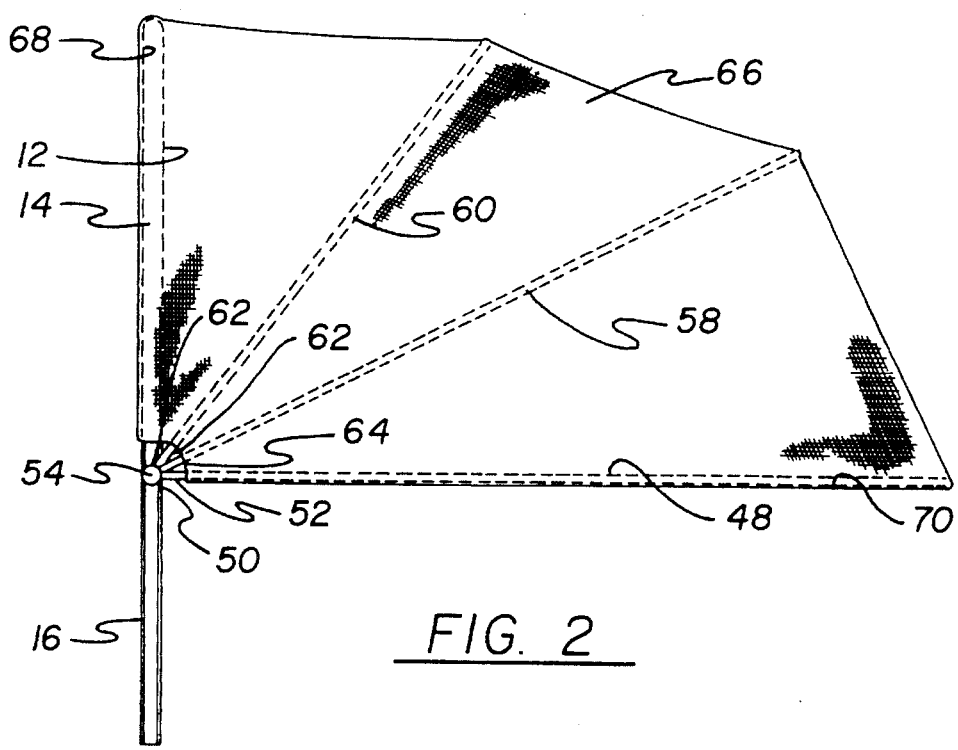
FIG. 2 is a side elevational view of the device shown in FIG. 1.
Figure 3:
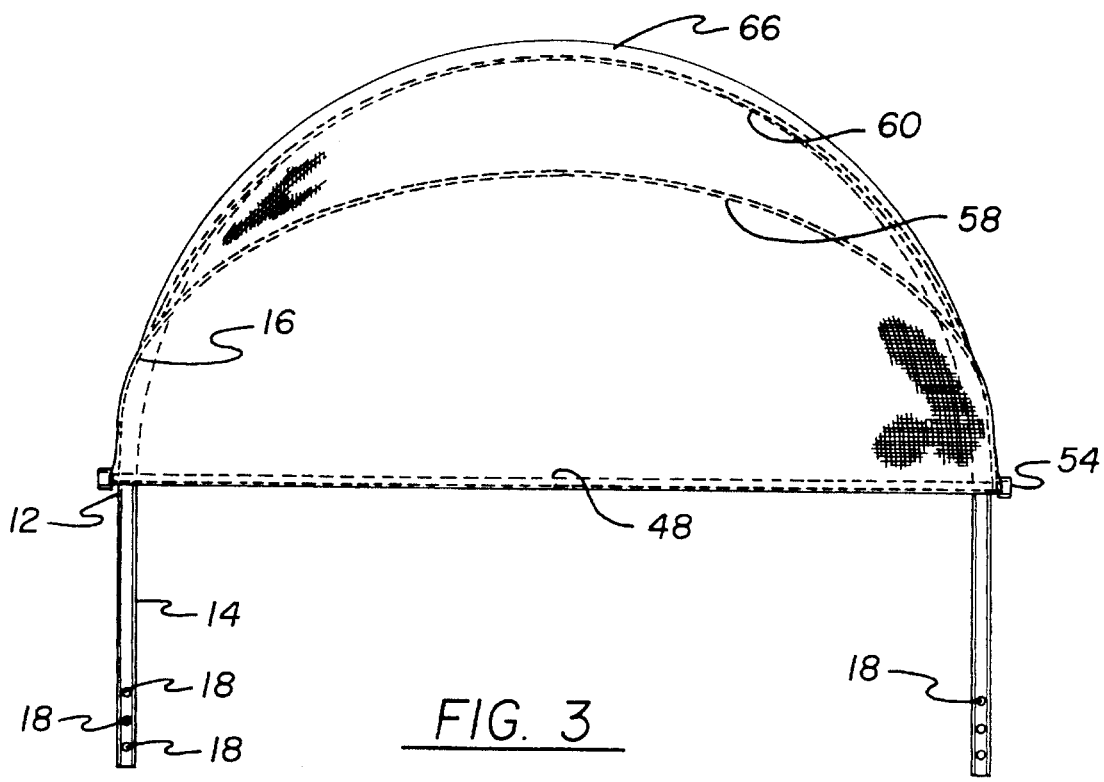
FIG. 3 is a front elevational view of the device shown in FIG. 1.
Figure 4:
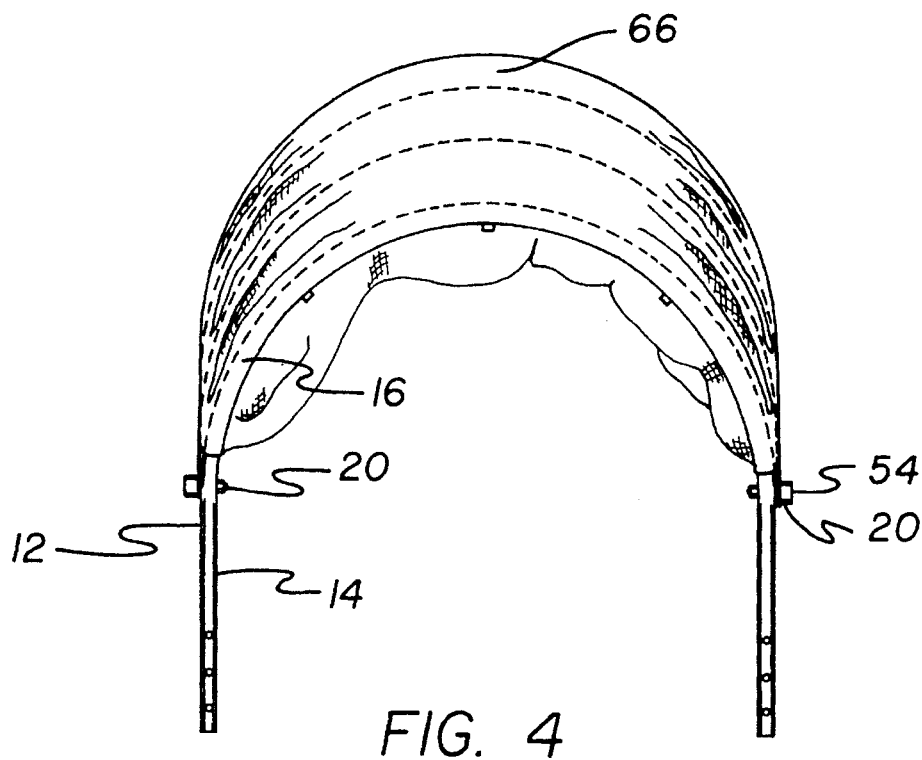
FIG. 4 is a rear elevational view of the device shown in the prior Figures but with the shade in the raised orientation.
Figure 5:
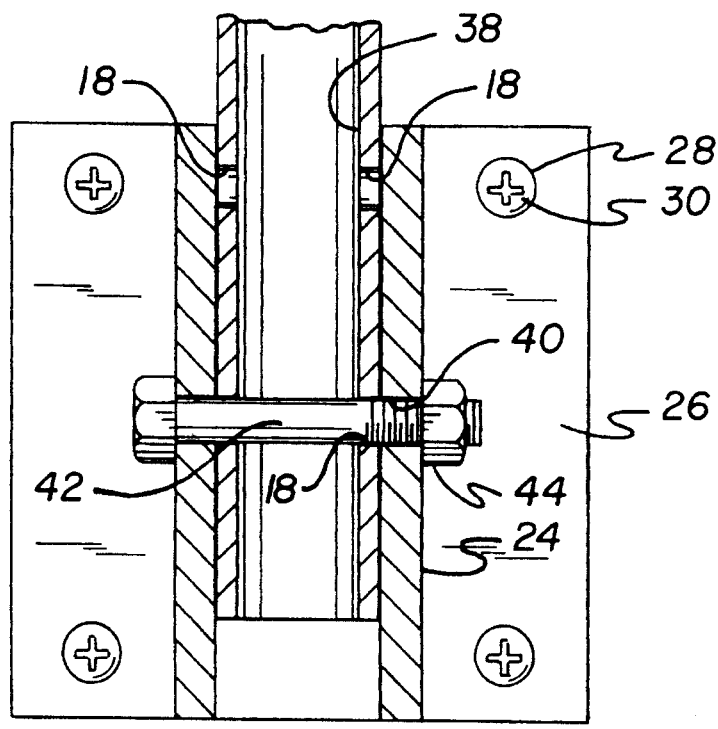
FIG. 5 is a cross sectional view taken through one receptor block.

With reference now to the drawings, and in particular to FIG. 1 thereof, a new and improved toddler car seat shade embodying the principles and concepts of the present invention and generally designated by the reference numeral 10 will be described.

The present invention, the new and improved toddler car seat shade, is comprised of a plurality of components. Such components in their broadest context include a first inverted U-shaped frame member, a pair of receptor blocks, an elongated inverted C-shaped frame member, pivot pins, two intermediate C-shaped frame members and a cloth. Such components are individually configured and correlated with respect to each other so as to attain the desired objective.

More specifically, the present invention is a system 10. A central component is the first inverted U-shaped frame member 12. Such frame member has downwardly extending vertical legs 14 and, integral therewith, an arcuate upper extent 16. The vertical legs each have a plurality of positioning apertures 18 extending therethrough. The axis of such positioning apertures are parallel one with respect to the other and perpendicular to a coupling aperture 20. The coupling aperture is located at the upper extent of each leg.

Next provided are a pair of similarly configured receptor blocks 24. Each receptor block has a vertical planar flange 26. Into the flange are formed apertures 28 for the receipt of screws 30. Such screws are for coupling the receptor blocks with respect to the opposite side portions 32 of the toddler car seat 34 to which the system of the present invention is to be utilized. Such coupling is adjacent to an upper extent of the car seat.

The blocks each have a central vertical bore 38. Such bore is for receiving the vertical legs of the inverted U-shaped frame member. Each block also has a horizontal aperture 40 extending therethrough. In association with each horizontal aperture is a bolt 42 with an associated nut 44. The bolt extends through the horizontal aperture and through a preselected positioning aperture of its associated vertical leg. The selection of the particular aperture will function for varying the height of the U-shaped frame member and shade with respect to the car seat.

The next component is an elongated inverted C-shaped frame member 48. Such frame member has an aperture 50 at each of its free internal ends 52. Coupling between the elongated inverted C-shaped frame member and the inverted U-shaped frame member is effected through a pair of pivot pins 54. Such pivot pins are positioned through the apertures of the elongated inverted C-shaped frame member and the coupling apertures of the inverted U-shaped member. Such pivot pins effect the pivotable coupling of the elongated inverted C-shaped frame member with respect to the inverted U-shaped frame member.

In addition, a plurality of intermediate C-shaped frame members 58, 60, preferably two in number, are provided. Such intermediate C-shaped frame members area of varying sizes. They are provided with apertures 62 at their lower free ends 64 for receiving and securement to the pivot pins.

The last component of the system 10 is a cloth 66. The cloth is positioned at one end over the inverted U-shaped frame member. At the other end, the cloth is positioned over the elongated C-shaped frame member. A first hem 68 in the cloth secures the cloth to the inverted U-shaped frame member. At the other end, an additional hem 70 couples the cloth to the elongated C-shaped member.

A collapsible shade which attaches onto a child safety seat, protecting the child from the harmful rays of the sun.

Similar in design to extendible shades located upon infant strollers, this device attaches onto the back of any standard automobile child safety seat. Several supports are located across the width of the device, enabling it to be extended forward or collapsed when not in use. It could be constructed from a durable fabric material, capable of providing shade to the seated child. In an open position, the protective cover is dome-like in shape, high enough to accommodate the child's height and his/her head movement. This device could be produced in a variety of colors and designs, and adaptable to a passenger seat for older children.

To secure the shield onto the automobile safety seat, the user simply attaches the rear base of the cover onto the back of the seat. Once the child has been appropriately positioned and secured within the seat, the cover is pulled forward, providing a canopy or awning over the seat and the child. After use, the device is pushed backward, against the back of the seat, enabling the child to be safely removed from within the seat.

This practical device aides in protecting a child's eyes from direct sunlight while traveling within the automobile. It also eliminates the need for applying awkward sunglasses or visors on the child.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved toddler car seat shade, comprising, in combination:

an inverted U-shaped frame member having downwardly extending vertical legs and an arcuate upper extent, the vertical legs each having a plurality of positioning apertures therethrough and a coupling aperture at the upper extent of each leg;

a pair of similarly configured receptor blocks, each receptor block having a vertical planar flange with apertures for the receipt of screws for coupling with respect to the opposite side portions of a toddler car seat adjacent to an upper extent thereof, the blocks each having a central vertical bore for receiving the vertical legs of the U-shaped frame member, the blocks each having a horizontal aperture therethrough with a bolt extending therethrough and through a preselected positioning aperture of the vertical legs for varying the height of the U-shaped frame member with respect to the car seat;

an elongated inverted C-shaped frame member having apertures at its free internal ends;

pivot pins positionable through the apertures of the elongated inverted C-shaped frame member and the coupling apertures of the inverted U-shaped frame member to effect the pivotal coupling therebetween;

two intermediate C-shaped frame members of varying sizes with apertures at their free ends secured to the pivot pins; and a cloth positionable over the inverted U-shaped frame member and the elongated C-shaped frame members with a hem in the cloth secured to the U-shaped frame member and the elongated C-shaped frame member.

* * * * *